UNITED STATES PATENT OFFICE.

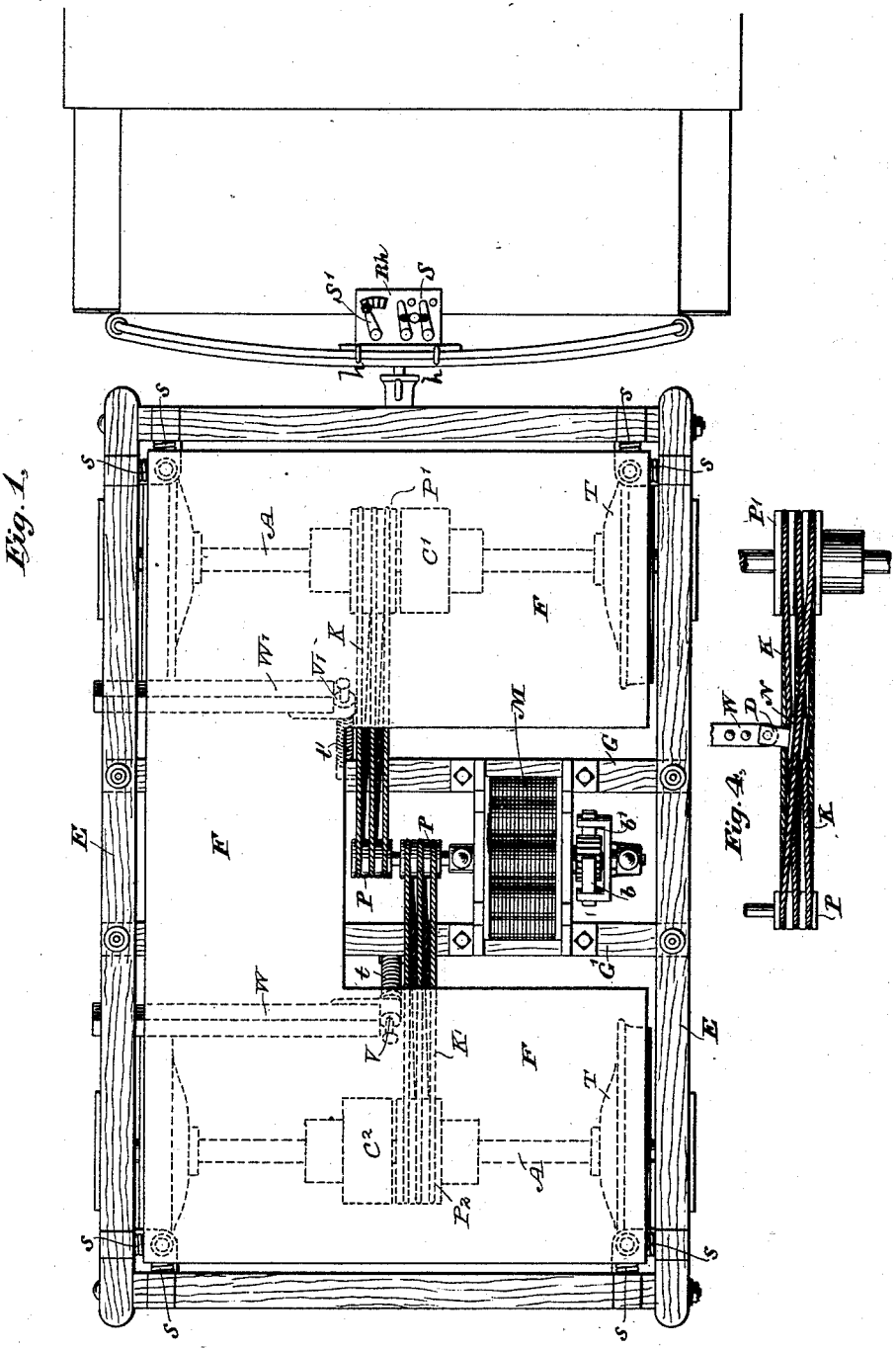

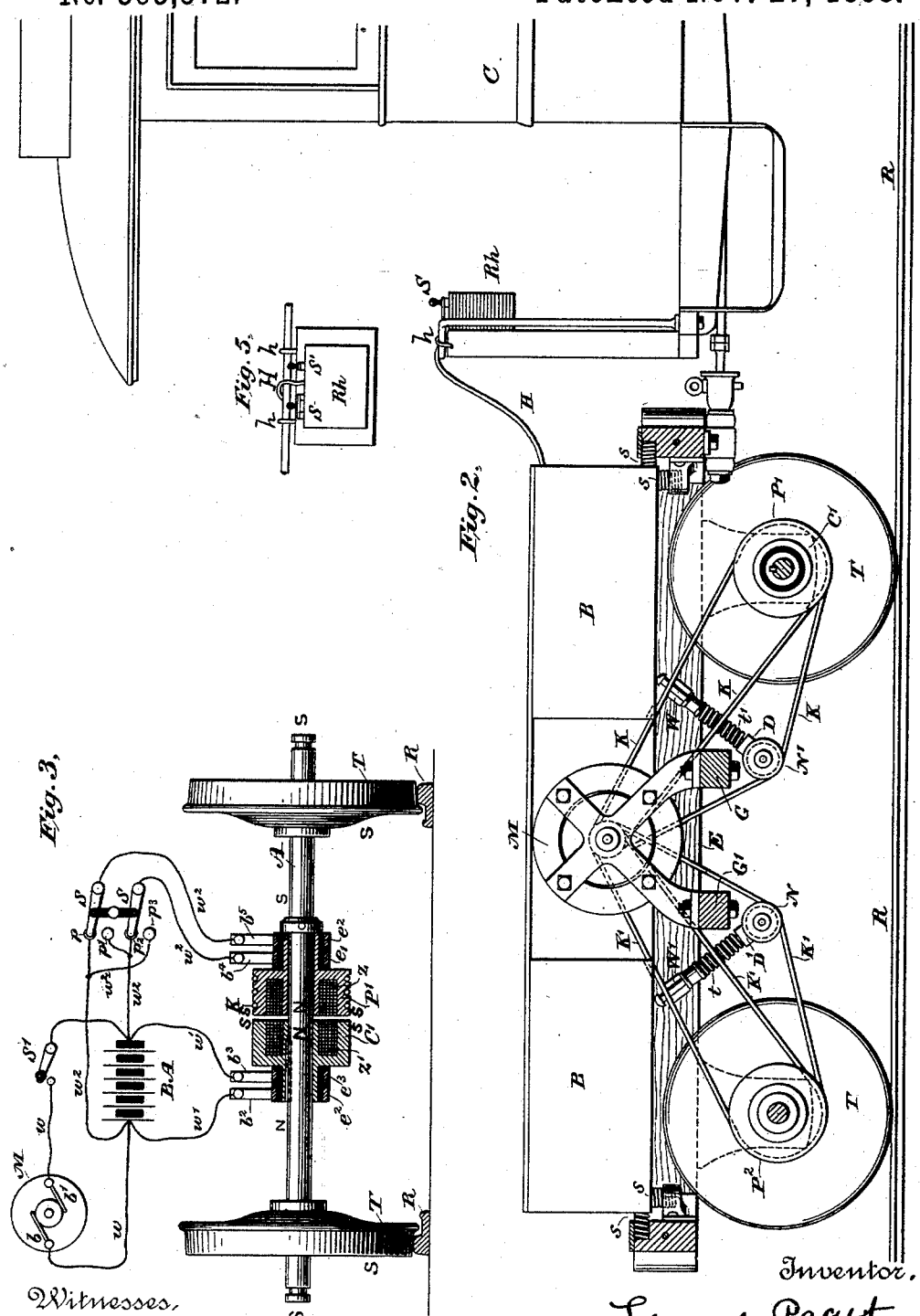

LEONARD PAGET, OF NEW YORK, N. Y., ASSIGNOR TO THE MACRAEON STORAGE BATTERY COMPANY, OF SAME PLACE.

APPARATUS FOR PROPELLING CARS.

SPECIFICATION forming part of Letters Patent No. 393,572, dated November 27, 1888.

Application filed July 21, 1888. Serial No. 280,609. (No model.)

*To all whom it may concern:*

Be it known that I, LEONARD PAGET, a citizen of the United States, residing at New York, in the county of New York and State of New York, have made a new and useful Invention in Apparatus for Propelling Tram-Cars and Analogous Vehicles, of which the following is a specification.

My invention relates to improvements in apparatus for drawing or driving tram-cars and analogous vehicles through the agency of electricity; and its objects are, first, to make the application of electrically-controlled power to existing lines of tram-cars and analogous vehicles possible without any change in either the rolling-stock or its appurtenances and in such manner as to obtain great efficiency; second, to provide means for the control of said power which shall be simple, efficient, and capable of use for other purposes on the lines where used than the mere propulsion of the cars, &c., as to clear the track of snow or dirt, and, in short, to utilize the applied power in numerous ways aside from its mere application as a means of propulsion; third, to provide simple and efficient clutch and switch connections for connecting the propelling electrical motor to the motor which moves the car or cars, and also to provide additional means for increasing the security and efficiency of said electrical motor and the source of electrical supply which gives it motion. I accomplish these objects by the apparatus hereinafter described, and particularly pointed out in the claims which follow this specification.

The invention will be fully understood by referring to the drawings accompanying the specification, in which—

Figure 1 is a plan view of my improved car-propelling vehicle, showing the trucks and portions beneath it in dotted lines, a tram-car being attached by the usual link-connection found on railway-cars. Fig. 2 is a side elevation of the same. Fig. 3 is a detail and diagrammatic view of the clutch and switch mechanism for connecting the electrical motor and battery to the axle or axles of the propelling motor or car. Fig. 4 is a detail view showing the tension-regulating apparatus for the rope or cord belting. Fig. 5 is a detail elevational view of the portable circuit-controlling apparatus.

Like letters represent like parts wherever used.

My invention is especially designed for application of electricity as a motive power in that class of inventions where the source of electrical generation is carried on board the engine which propels or draws the vehicle to be moved.

I am aware that it is old to generate electricity on board of a moving vehicle—such as a railway-car—or to carry storage or primary batteries upon such vehicle and to connect the same with the propelling electrical motor, also carried by the car, and that it is also old to utilize such a source of power when carried by a dummy or independent engine, and I do not claim such features, broadly, my invention being directed to the apparatus hereinafter described and claimed, in which I make provision for carrying the propelling battery and motor on an engine or motor entirely independent from the load to be transported. By my improved apparatus I fix the electrical motor directly to the rigid frame of the car which carries it, and connect its pulley or pulleys by rope or cord belting with tension-regulating devices adapted to keep the cords always in secure frictional contact with the pulleys of the motor and both axles of the truck between which it is located. I also provide a cushioned or spring-seated apartment for carrying the battery entirely detached mechanically from the motor and its adjuncts. I also provide simple and efficient switch and clutch mechanism, the latter located on board the dummy or motor engine and all under the control of an engineer for operating the apparatus.

Referring to the drawings in detail, R R are the rails of an ordinary tram-car track; T T, the trucks; A A, the axles of a dummy or motor-carrying car having a rigid frame, E E, carried directly by said trucks. Near the middle of this frame is a pair of strong floor-timbers, G G', extending from sleeper to sleeper, upon which is firmly bolted an electrical motor, M, of any preferred type, the pulleys P P on the motor-shaft being located midway between and above the axles A A of the truck-wheels T T.

P' and P² are grooved pulleys adapted to run loosely on the axles A A and to receive the ropes or cords K K'. This system of rope or cord belting with the accompanying tension-regulating apparatus is quite well known in the mechanical arts and needs no specific description here other than to say that in each instance the ropes or cords are endless and the tension-pulleys N N' are applied to the cross-cords, as shown in Figs. 2 and 4. These tension-pulleys N and N' are supported upon cross-arms W W', attached to the sleepers of the car-frame, and are adapted to yield to the inequalities which take place in the rope's action by spiral springs $t$ $t'$ pressing against the heads of the sliding sustaining-arms D D', and also having a lateral adjustment due to the swivel-connections, as shown in Fig. 4. These parts are of course adjustably attached, so as to regulate the pressure of the pulleys upon the cords or ropes. The pulleys P P are attached directly to the armature-shaft, while P' and P² are journaled loosely upon the axles A A of trucks T T. These pulleys P' P² are made of magnetic material, as iron, and are provided with insulated wire bobbins Z Z, so wound upon or about them as to magnetize them when a current of electricity is passed through them.

C' C² are two similar magnetic masses similarly wound with insulated coils $z'$ $z'$ in such manner that they will become magnetic when said coils are electrically charged.

Referring now to Fig. 3, I will describe the electrical connections of the fixed and loose clutching parts P' C', P² and C² being duplicates thereof. The part C' is rigidly keyed to the axle A. The ends of coil $z$ are connected, respectively, to the metallic rings or bands $e^2$ $e'$, insulated, as shown, and these bands are connected in turn through brushes $b^5$ $b^4$ to the wires $w^2$ $w^2$, leading to the pole changing switch S S, and they in turn are connected at points $p$ $p^2$ to the battery or generator B A, preferably a storage-battery. Similarly the ends of coil $z'$ are connected by insulated bands $e^2$ $e^3$, brushes $b^2$ $b^3$, and wires $w'$ to the poles of the battery or generator. The poles of the motor M are connected by brushes $b$ $b'$ and wires $w$ $w$, through switch S', to the poles of the same battery or generator. All of these conductors are preferably inclosed in a flexible cable, H, and connected to a portable switch-board having hooks $h$ $h$, and carrying the usual rheostat, R $h$, and switches S S and S', for manipulating the motor-car.

The switches may be arranged in any desired manner, and I may substitute a pole-switch in the well-known manner for S', so as to be enabled to reverse the direction of the motor and run the car in either direction.

The portable switch apparatus connected through a flexible cable, H, is hung, as shown, by the hooks $h$ $h$ upon the dash-board on the front platform of the first car, so that the attendant can stand on this platform and control its movements. Of course this apparatus might be carried on board the motor or dummy and be in any preferred position. With this arrangement I am enabled to attach my dummy or motor to any existing car by simply coupling the connecting-links and placing the switch mechanism as shown. It may, in like manner, be attached in the rear of a snow-plow or dirt-sweep.

The operation of the apparatus is as follows: As shown in Fig. 3, the motor M is out of circuit and the loose grip or clutch pulley P' held away from the face of its opposing fixed part C' by the repellent action due to the like poles of the magnetic parts, the current through $z$ being in such direction as to create a north interior and a south exterior pole, while the interior and exterior poles of C' are always north and south, respectively, by reason of the constant direction of current from battery B A. Suppose now the switch S' to be closed. There results a multiple-arc branch of the circuit from battery B A by wires $w$ to the motor M, and its armature commences to rotate, carrying with it the loose pulleys P' P² under stress of the cords or ropes K K'. (See Fig. 2.) After the motor has attained a sufficient speed switch S S is reversed, thereby reversing the direction of the current through the coils $z$ $z$ of the loose magnetic pulleys P' and P², causing them to slide longitudinally on the axles A A in the direction of the fixed parts C' C², thereby clutching the two parts firmly together and imparting motion to said axles and trucks T T of the dummy or motor car. The speed can of course be regulated in any well-known manner, as by the rheostat R $h$—a feature familiar to those versed in the art.

It will be noticed that by locating the magnetic pulleys P' and C', P² and C², upon the axle-shafts of magnetic material, as iron, the truck-wheels being also of iron, these parts become magnetized, thereby increasing the traction of the engine. This is a very valuable and important feature in connection with my improved form of clutch. I find that with a secondary or storage battery located in the spring sustained box B, and this method of uniting the clutching apparatus, and at the same time increasing the traction, I provide a simple and efficient motor for propelling vehicles. This box B is made with a bottom, F F, having an opening at one side and near the center to permit access to the motor, as clearly shown in Fig. 1. It is sustained upon the frame E E against lateral longitudinal and vertical vibrations due to inequalities in the road by strong springs $s$ $s$ $s$ at or near each corner, thereby permitting the battery to be carried with a minimum amount of disturbance.

The motor M projects above the car-floor and through the battery-box B, so that all of its parts are accessible to the attendant, and it is kept free from dust or dirt. It will be understood that this motor may be utilized in the propulsion of all kinds of vehicles ordinarily propelled or drawn by horse or steam and analogous powers, and I design to use it in that generic sense.

I am aware that it is old in the art to actuate clutches electro-magnetically, and I make no claim to such feature, broadly.

I am also aware that it is old to fix an electric motor rigidly to the floor-beams of a car, and to connect its armature-pulley with pulleys on the car-axles located on either side and by belting, and I do not claim that generic feature; but What I do claim, and desire to secure by Letters Patent of the United States, is—

1. In a car or motor for propelling cars or analogous vehicles, a fixed electric motor rigidly secured to the car-frame, two loose magnetic pulleys journaled on independent car-axles, two fixed magnetic pulleys fixed rigidly to said car-axles, pulleys on the armature-shaft of the motor, said pulleys being joined by rope or cord belting to the loose pulleys, as described, and electrical connections for causing the loose pulleys to adhere to the fixed pulleys and thereby transmit power to the car-axles when the motor is energized electrically, substantially as described.

2. A motor-car for propelling cars or analogous vehicles, consisting of a rigid frame carried by trucks, an electric motor secured to said frame, pulleys attached to the armature-shaft of the motor, fixed and loose magnetic pulleys carried by the axles of the car, rope belting joining said pulleys, and electrical connections for magnetizing and demagnetizing said pulleys, and tension-regulation devices for keeping the rope belting taut, substantially as described.

3. In a clutch for use in electrically-propelled cars, the combination of a fixed and a loose magnetic pulley located on the axle of the vehicle, with electrical connections, as described, for causing the pulleys to adhere together, and the truck-wheels to maintain increased traction for the rails, substantially as described.

4. An improved means for gearing the axle of a car to be propelled to an electric motor located on board said car, and at the same time giving increased traction between the rails and the wheels of the car, said means consisting of fixed and movable magnetic pulleys, both located on the car-axle and each provided with an electrical circuit and connections for magnetizing and demagnetizing it, the car-axle constituting a magnetic core to both pulleys, substantially as described.

5. In a car for propelling cars or analogous vehicles by electricity, a clutch for gearing a motor carried by the car to the axle thereof, said clutch being carried by an axle of the car, and consisting of a fixed and a loose pulley, both of magnetic material, and having each an insulated coil of wire wound concentric with its axis and the axle of the car, said insulated wires being connected to a battery through insulated conducting-bands, brushes, and switches, as described, whereby the loose pulley is adapted to run free under the influence of the propelling-motor or be connected mechanically to the fixed pulley dependent upon the position of the switch mechanism, substantially as described.

6. The combination of an electric motor for propelling cars by electricity and a battery, all carried by the car, with switches and multiple-arc connections from the battery to the motor, and magnetic clutch mechanism for connecting the motor to the axle of the car, substantially as described.

7. A detachable or portable switch-board provided with hooks or sustaining devices and switches connected through conductors running to a battery and electric motor located on a car or dummy-engine propelled by said motor, substantially as described.

8. A detachable switch-board having sustaining devices for attaching it to the dash-board of a tram-car, in combination with switches and circuit-connections extending through a flexible cable to a separate motor-car, substantially as described.

LEONARD PAGET.

Witnesses:
C. J. KINTNER,
J. F. QUINN.